United States Patent
Duffy et al.

(12)

(10) Patent No.: US 7,628,425 B2
(45) Date of Patent: Dec. 8, 2009

(54) ENERGY ABSORPTION DEVICE FOR VEHICLE STEERING COLUMN

(75) Inventors: Patrick Anthony Duffy, Leicester (GB); James Peter Bentley, Coventry (GB); Laurence George Herbert Barton, Leaminhton SRA (GB)

(73) Assignee: NSK Steering Systems Europe Limited, Maidenhead, Berkshire (GB)

( * ) Notice: Subject to any disclaimer, the term of this patent is extended or adjusted under 35 U.S.C. 154(b) by 754 days.

(21) Appl. No.: 10/910,321

(22) Filed: Aug. 4, 2004

(65) Prior Publication Data

US 2005/0082812 A1    Apr. 21, 2005

(30) Foreign Application Priority Data

Aug. 6, 2003    (GB) ................. 0318385.2

(51) Int. Cl.
    *B62D 1/00*    (2006.01)
(52) U.S. Cl. ...................................... 280/777
(58) Field of Classification Search ............. 280/777; 188/371, 372, 373, 374; 74/492
    See application file for complete search history.

(56) References Cited

U.S. PATENT DOCUMENTS

| 5,609,364 | A | 3/1997 | Fouquet et al. ............. 280/777 |
| 6,183,012 | B1* | 2/2001 | Dufour et al. ............... 280/777 |
| 6,234,528 | B1 | 5/2001 | Ben-Rhouma et al. ...... 280/777 |
| 6,241,284 | B1* | 6/2001 | De Verdier et al. .......... 280/777 |
| 6,322,103 | B1* | 11/2001 | Li et al. ...................... 280/777 |

FOREIGN PATENT DOCUMENTS

| DE | 1 605 885 A1 | 4/1971 |
| DE | 195 17 485 | 11/1996 |
| DE | 195 17 485 A1 | 11/1996 |
| DE | 600 06 815 T2 | 5/2004 |
| GB | 2 267 873 | 12/1993 |

* cited by examiner

*Primary Examiner*—Faye M. Fleming
(74) *Attorney, Agent, or Firm*—Miles & Stockbridge P.C.

(57) ABSTRACT

An energy absorption device for a steering column for a vehicle includes a resilient device, preferably in the form of a coil spring, having turns that are wound in a clamping manner around a component such as a cylindrical rod connectable to the steering column. The coil spring and cylindrical rod are slidable relatively to each other to absorb energy in the event of a vehicle crash. An adjusting device is arranged to vary the clamping force of the turns of the coil spring on the rod by winding or unwinding the coils of the spring. The clamping force may be adjusted in accordance with data such as stature of the driver, vehicle speed and vehicle attitude.

26 Claims, 1 Drawing Sheet

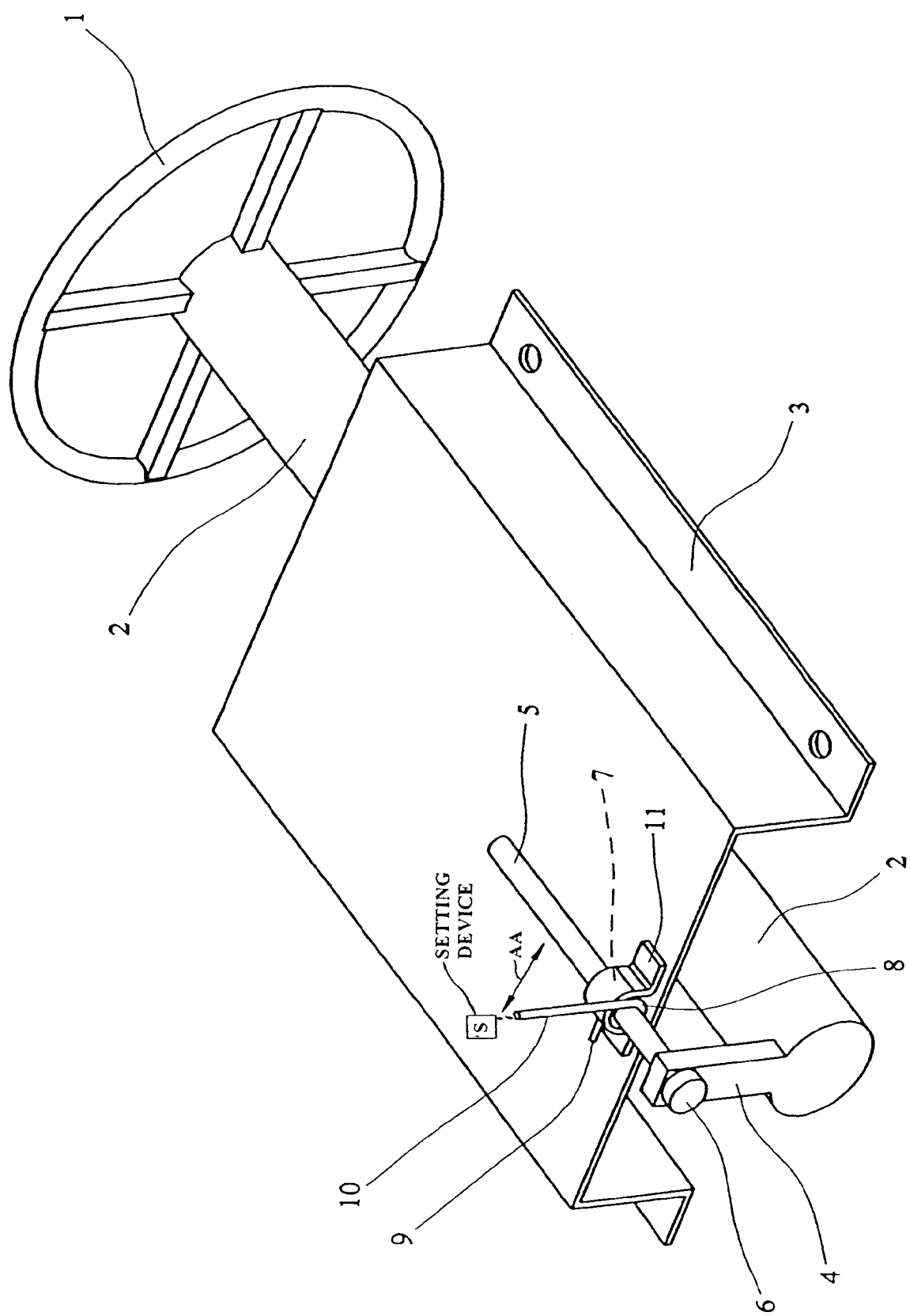

ENERGY ABSORPTION DEVICE FOR VEHICLE STEERING COLUMN

BACKGROUND OF THE INVENTION

This invention relates to an energy absorption device for a steering column for a vehicle.

Many such devices are known to provide controlled collapse of a steering column in the event of vehicle crash. During a collision, such devices allow the steering column to collapse and dissipate energy developed by the occupant in a controlled manner.

SUMMARY OF THE INVENTION

According to one aspect of the present invention, there is provided an energy absorption device for a steering column for a vehicle, the device including a resilient means having turns that are wound in a clamping manner around a component connectable to the steering column, the resilient means and component being slidable relatively to each other during collapse of the steering column, thereby to absorb energy, in the event of vehicle crash.

The component may be a cylindrical member, for example, such as a rod about which the turns of the resilient means are wound.

A coating may be applied to at least one contact surface of the resilient means and/or the component to control the friction effort between the resilient means and the component.

The component may form part of the steering column itself or may be joined to it as a separate component.

The component and resilient means are preferably arranged so that the relative movement between them is parallel to the intended direction of collapse of the steering column.

The resilient means may be a coil spring, for example.

The coil spring may be provided with two ends which extend outwardly from the turns of the coil spring, for example, in a tangential or radial manner.

One of the two ends of the coil spring may be urged by the resilience of the coil spring against a fixed component. The fixed component may be a mounting bracket for the steering column.

The other end of the two ends of the coil spring may be engaged with an adjusting device so as to be movable by the adjusting device.

The adjusting device can be arranged to vary the clamping force of the turns of the coil spring on the component by winding or unwinding (tightening or loosening) the coils of the spring about the component, acting through said other end of the coil spring.

Means could be provided to adjust the clamping force of the resilient means in accordance with predetermined data such as the stature of the driver, vehicle speed and vehicle attitude. An electronically controlled actuator could be provided to this end to adjust the resilient means appropriately.

The invention also extends to a vehicle steering column incorporating the energy absorption device as defined above.

The invention also extends to a vehicle incorporating a steering column for a vehicle having such an energy absorption device.

BRIEF DESCRIPTION OF THE DRAWING

For a better understanding of the invention and to show how the same may be carried into effect, reference will now be made, by way of example, to the accompanying single FIGURE, which shows a diagrammatic perspective view of an energy absorption device fitted to a steering column for a vehicle.

DESCRIPTION OF THE PREFERRED EMBODIMENTS

The drawing shows a steering wheel 1 attached to a steering column 2, which is mounted by means (not shown) to a fixed mounting bracket 3. The steering column 2 is provided along its length with a radially-extending finger 4. The end of the finger 4 remote from the steering column 2 has a component extending from it. In the example illustrated, the component is a cylindrical rod 5 that passes through an aperture in the finger 4 and is restrained at one end by a head 6 joined to the rod 5 and lying against a face of the finger 4.

Turns 7 of a resilient means in the form of a coil spring 8 are wound around the circumference along at least part of the length of the rod 5. The coil spring 8 has two ends 9 and 10, respectively. The end 9 is arranged to lie resiliently against part of the surface of the fixing bracket 3 in the example illustrated, whilst the end 10 is preferably arranged to be engaged by an adjustable setting device S as indicated diagrammatically in the FIGURE.

In its free state, the coil spring 8 has an inside diameter that is smaller than the outside diameter of the rod 5. Thus, when the spring 8 and rod 5 are assembled together, the coil spring 8 has a natural tendency to clamp the rod 5 and this effect is used as the basis for a friction-type energy absorption system. As explained, the end 9 of the coil spring is prevented from rotating, while the other end 10 of the coil spring is attached to the adjustable setting device. The setting device can vary the clamping force of the coil spring on the rod by winding or unwinding (tightening or loosening) the coils 7 of the spring about the rod 5. The end 10 of the coil spring can therefore move substantially in the direction indicated by the double arrow AA.

In the event of a vehicle crash, the steering column 2 will collapse in a direction away from the driver to cause the finger 4 to bear against the head 6 of the rod 5. This of course will cause the rod to be drawn through the turns of the coils 7 of the coil spring 8 in the same direction of movement as the steering column under the friction provided by the tension in the coils 7.

During manufacture, the system can be set via mechanical means, e.g. a screw type mechanism (not shown), The energy absorption load generated can be varied depending on the market, and this could be achieved without the need for different components for different markets. It is also envisaged that the energy absorption device could be adjusted in real time during a vehicle collision.

The friction effort between the contact surfaces of the coils 7 and the rod 5 can further be controlled as desired by applying a coating (not shown) to the coils 7 and/or rod 5.

In preferred practice of the invention, the variation in energy absorption can be matched to the stature of the driver. More particularly, the energy absorption level required can be determined by conditions before or at the time of a collision event. Adjustments can be made based on inputs from the vehicle that determine, for example, driver height/weight, vehicle speed and vehicle attitude. All these inputs can be fed back to an electronically controlled actuator, which in turn would wind or unwind the coils 7 of the coil spring 8 around the rod 5.

Although in the drawing a simple bracket 11 is shown encasing the coils 7 of the spring 8, it will be appreciated that the bracket 11 could be omitted.

The invention claimed is:

1. An energy absorption device for a steering column for a vehicle, the device including a resilient device having turns that are wound in a clamping manner around an inner component, and means for connecting the inner component to the steering column, said resilient device and said inner component being slidable relatively to each other during collapse of the steering column, thereby to absorb energy, in the event of a vehicle crash,
wherein the inner component is arranged so as to slide through the turns of the resilient device in an axial direction of the turns in response to collapsing movement of the steering column, and
wherein an electronically controlled actuator is provided to adjust the clamping force of the resilient device.

2. A device according to claim 1, wherein said inner component is a cylindrical member about which the turns of the resilient device are wound.

3. A device according to claim 2, wherein the cylindrical member is a rod.

4. A device according to claim 1, wherein a coating is applied to at least one contact surface of the resilient device and/or said inner component to control the friction effort between the resilient device and component.

5. A device according to claim 1, wherein said inner component forms part of a steering column for a vehicle.

6. A device according to claim 1, wherein said inner component is joined to a steering column for a vehicle as a separate component.

7. A device according to claim 1, wherein said inner component and resilient device are arranged so that relative movement between them is parallel to an intended direction of collapse of the steering column.

8. A device according to claim 1, wherein the resilient device is a coil spring.

9. A device according to claim 8, wherein the coil spring is provided with two ends which extend outwardly from the turns of the coil spring in a tangential or a radial manner.

10. A device according to claim 9, wherein one of said two ends of the coil spring is urged by resilience of the coil spring against a fixed component.

11. A device according to claim 10, wherein said fixed component is a mounting bracket for the steering column.

12. A device according to claim 10, wherein the other end of the two ends of the coil spring is engaged with an adjusting device.

13. A device according to claim 12, wherein said adjusting device is arranged to vary clamping force of turns of the coil spring on said inner component by winding or unwinding the coils of the spring about said inner component, acting through said other end of the coil spring.

14. A device according to claim 1, wherein a device is provided to adjust the clamping force of the resilient device in accordance with predetermined data.

15. A device according to claim 14, wherein said predetermined data includes at least one of stature of the driver, vehicle speed and vehicle attitude.

16. A vehicle steering column incorporating an energy absorption device according to claim 1.

17. A vehicle incorporating a steering column according to claim 16.

18. An energy absorption device for a steering column for a vehicle, the device including a resilient device having turns that are wound in a clamping manner around an inner component, and means for connecting the inner component to the steering column, the inner component being slidable axially through the turns of the resilient device during collapse of the steering column, thereby to absorb energy, in the event of a vehicle crash,
wherein the inner component is arranged so as to slide through the turns of the resilient device in an axial direction of the turns in response to collapsing movement of the steering column, and
wherein an electronically controlled actuator is provided to adjust the clamping force of the resilient device.

19. An energy absorbing steering column assembly, comprising:
a collapsible steering column and an energy absorbing device, the energy absorbing device including a first member and a second member having turns wound around the first member in a clamping manner, the energy absorbing device being coupled to the steering column such that the first and second members are movable relative to each other, to absorb energy by effect of clamping force between the first member and the turns of the second member, during collapse of the steering column,
wherein the first member is arranged so as to slide through the turns of the second member in an axial direction of the turns in response to collapsing movement of the steering column,
wherein the steering column assembly further comprises an intermediate member extending laterally of the steering column and coupling the steering column to the energy absorbing device, and
wherein an electronically controlled actuator is provided to adjust the clamping force of the resilient device.

20. An energy absorbing steering column assembly according to claim 19, wherein said first member is a cylindrical member.

21. An energy absorbing steering column assembly according to claim 19, wherein said second member is a coil spring.

22. An energy absorbing steering column assembly according to claim 21, further comprising an adjusting device operable to adjust a clamping force turns of said spring about said first member.

23. An energy absorbing steering column assembly according to claim 21, wherein said first member is a cylindrical member.

24. An energy absorbing steering column assembly according to claim 23, wherein said cylindrical member is connected to said steering column so as to be drawn axially through the turns of said spring by collapsing movement of said steering column.

25. A vehicle comprising an energy absorbing steering column assembly, said energy absorbing steering column assembly including:
a collapsible steering column and an energy absorbing device, the energy absorbing device including a first member and a second member having turns wound around the first member in a clamping manner, the energy absorbing device being coupled to the steering column such that the first and second members are movable relative to each other, to absorb energy by effect of clamping force between the first member and the turns of the second member, during collapse of the steering column,
wherein the first member is arranged so as to be displaced axially through the turns of the second member by collapsing movement of the steering column, and
wherein an electronically controlled actuator is provided to adjust clamping force of the second member in accordance with predetermined data.

26. An energy absorbing steering column assembly, comprising:

a collapsible steering column and an energy absorbing device, the energy absorbing device including a first member laterally spaced from the steering column, and a second member having turns wound around the first member in a clamping manner such that the turns have an axis laterally spaced from an axis of the steering column, the energy absorbing device being coupled to the steering column such that the first and second members are movable relative to each other, to absorb energy by effect of clamping force between the first member and the turns of the second member, during collapse of the column, wherein the first member is arranged so as to be displaced axially through the turns of the second member by collapsing movement of the steering column, and wherein an electronically controlled actuator is provided to adjust clamping force of the second member in accordance with predetermined data.

* * * * *